(12) United States Patent
Moon et al.

(10) Patent No.: US 8,107,574 B2
(45) Date of Patent: Jan. 31, 2012

(54) FILTER TUNING CIRCUIT FOR WIRELESS COMMUNICATION SYSTEM

(75) Inventors: Yeon Kug Moon, Seoul (KR); Tae Ho Hwang, Seoul (KR); Dong Sun Kim, Gyeonggi-do (KR); Kwang Ho Won, Gyeonggi-do (KR); Yong Kuk Park, Gyeonggi-do (KR)

(73) Assignee: Korea Electronics Technology Institute, Seongnam-si (KR)

( * ) Notice: Subject to any disclaimer, the term of this patent is extended or adjusted under 35 U.S.C. 154(b) by 825 days.

(21) Appl. No.: 12/200,366

(22) Filed: Aug. 28, 2008

(65) Prior Publication Data

US 2010/0054369 A1    Mar. 4, 2010

(51) Int. Cl.
*H04B 1/10*    (2006.01)

(52) U.S. Cl. ............... 375/350; 375/377; 327/553
(58) Field of Classification Search ............... 375/330, 375/346, 350, 377; 708/300, 307; 327/103, 327/335, 553
See application file for complete search history.

(56) References Cited

U.S. PATENT DOCUMENTS

| | | | |
|---|---|---|---|
| 6,509,796 B2 | 1/2003 | Nguyen et al. | |
| 6,930,544 B2 * | 8/2005 | Yokoyama | 327/552 |
| 7,177,895 B2 | 2/2007 | Na et al. | |
| 7,239,197 B2 * | 7/2007 | Chen et al. | 327/553 |
| 7,466,192 B2 * | 12/2008 | Nakabo et al. | 327/558 |
| 2005/0122161 A1 * | 6/2005 | Fujimura | 327/552 |

* cited by examiner

*Primary Examiner* — Dac Ha
(74) *Attorney, Agent, or Firm* — NSIP Law

(57) ABSTRACT

A filter tuning circuit for a wireless communication system is provided. A filter tuning circuit includes a comparator and a counter which control a transconvertance value of a differential transconverter to tune a filter.

17 Claims, 4 Drawing Sheets

FILTER TUNING CIRCUIT FOR WIRELESS COMMUNICATION SYSTEM

TECHNICAL FIELD

The following description relates to a filter tuning circuit for a wireless communication system, and in particular, to a filter tuning circuit for a wireless communication system which uses a transconductance.

BACKGROUND

A wireless communication system includes wireless personal area networks (WPANs), wireless local area networks (WLANs) and a mobile communication system using code division multiple access (CDMA), global system for mobile communication (GSM), wideband code division multiple access (WCDMA), etc.

Generally, a wireless communication system includes a transmitter for transmitting information (video, voice, data) provided as a radio frequency (RF) signal, and a receiver for receiving the RF signal and obtaining a baseband signal from the received RF signal.

A plurality of filters may be designed for a receiver. Generally, the filters require high filter attenuation characteristics. However, a receiver, which is mounted in a wireless communication system for the local area such as the WPANs and the WLANs, may require low attenuation characteristics of a filter. This is because a receiver of the wireless communication system for the local area has channel spacing relatively broader than a channel bandwidth thereof. Accordingly, a lower order filter may be applied to the receiver of the wireless communication system for the local area. However, to ensure competitiveness of products, requirements for a low power operation are a growing trend.

A transconductance-capacitor (hereinafter, referred to as a Gm-C) filter may be designed in a receiver for the recovery of a received signal and the anti-aliasing of a transmitted signal. The Gm-C filter denotes a filter including a transconductor and a capacitor. The transconductor may mean a circuit outputting an output current proportional to an input voltage. The output current equals a value obtained from the multiplication of the input voltage and the transconductance (gm) of the transconductor. The cut-off frequency of the Gm-C filter may be in proportion to "gm/C", wherein C is the capacitance of the capacitor.

In a Gm-C filter, a transconductance value (gm value) determining the cut-off frequency varies with a temperature, the variation of a power supply voltage and a manufacturing process. Accordingly, in a case where the Gm-C filter is used, a tuning circuit may be used to constantly keep the cut-off frequency.

A conventional tuning circuit may include a voltage controlled oscillator (VCO) to adjust the transconductance value (gm value) of the transconductor, and thus constantly keeps the cut-off frequency of the Gm-C filter.

However, such a tuning circuit typically requires the designs of a frequency comparator (or a frequency discriminator), a filter (e.g., a low pass filter) included in the inside thereof and wiring for receiving an external clock, in addition to a VCO. Accordingly, it may be difficult to design such a tuning circuit and the size of the resulting tuning circuit may increase, and consequently, such a tuning circuit may consume a high consumption power.

SUMMARY

Accordingly, according to an aspect, there is provided a filter tuning circuit for a wireless communication system which reduces power consumption and a total area of a design without separately requiring an external clock.

According to another aspect, there is provided a filter tuning circuit for a wireless communication system comprising a differential transconductor for outputting a differential output current proportional to a differential input voltage, a current-voltage converter comprising a capacitor, wherein the current-voltage converter generates a charge voltage charged in the capacitor by the differential output current as a differential output voltage, a comparison circuit for generating an analog control voltage in response to the differential output voltage, and comparing a predetermined reference voltage with the differential output voltage to generate a count drive signal, and a counter circuit for generating a digital control signal increased or reduced by the number of a certain bit from the number of a reference bit according to the count drive signal, wherein the differential transconductor receives the feedback of the analog control voltage from the comparison circuit and the feedback of the digital control signal from the counter circuit.

The differential tranconductor may output the differential output current linearly proportional to the differential input voltage on the basis of the feedback analog control voltage and the feedback digital control signal.

The filter tuning circuit may further comprise an input voltage generator for receiving a predetermined common voltage, and generating the differential input voltage having a positive input voltage and a negative input voltage which are symmetrical about the common voltage.

The input voltage generator may comprise a first current source, a first resistor, a second resistor, and a second current source which are connected in series between a power supply voltage terminal and a ground, output the positive input voltage through a first node connecting the first current source to the first resistor electrically, and output the negative input voltage through a second node connecting the second current source to the second resistor electrically.

The differential transconductor may comprise a transconductance driving unit for outputting a differential output current proportional to the differential input voltage, a degeneration tuning unit for tuning a degeneration amount of a source of the transconductance driving unit in response to the analog control voltage from the comparison circuit and the digital control signal from the counter circuit, and a common mode feedback unit for sensing and stabilizing a voltage of an output terminal of the transconductance driving unit.

The transconductance driving unit may comprise a first NMOS transistor for outputting a negative current of the differential output current in response to a positive voltage of the differential input voltage, and a second NMOS transistor for outputting a positive current of the differential output current in response to a negative voltage of the differential input voltage.

The degeneration tuning unit may comprise a first NMOS transistor for a degeneration resistor for tuning a degeneration amount of a source of the first NMOS transistor according to the analog control voltage, a first variable resistor for tuning a degeneration amount of a source of the first NMOS transistor together with the first NMOS transistor for the degeneration resistor according to the digital control signal, a second NMOS transistor for a degeneration resistor for tuning a degeneration amount of a source of the second NMOS transistor according to the analog control voltage, and a second variable resistor for tuning a degeneration amount of the second NMOS transistor together with the second NMOS transistor for the degeneration resistor according to the digital control signal.

The differential transconductor may comprise a first output terminal for outputting a positive current of the differential output current, and a second output terminal for outputting a negative current of the differential output current, and wherein the current-voltage converter may comprise a fourth node connected to the first output terminal electrically, a third current source and a first capacitor connected in series through the fourth node between a power supply voltage terminal and a ground, a fifth node connected to the second output terminal electrically, and a second capacitor and a fourth current source connected in series through the fifth node between the power supply voltage terminal and the ground.

The differential output voltage may be composed of a first output voltage corresponding to a positive current of the differential output current and a second output voltage corresponding to a negative current of the differential output current, and the comparison circuit may comprise a first comparator for generating the analog control voltage corresponding to a voltage difference between the first output voltage and the second output voltage.

The comparison circuit may output an up count signal driving the counter circuit to increase the number of bits of the digital control signal and output a down count signal driving the counter circuit to reduce the number of bits of the digital control signal.

The count drive signal output from the comparison circuit may comprise an up count signal driving the counter circuit to increase the number of bits of the digital control signal and a down count signal driving the counter circuit to reduce the number of bits of the digital control signal.

The reference voltage applied to the comparison circuit may have a voltage level between a first reference voltage and a second reference voltage less than the first reference voltage, and MOS transistors designed in the differential transconductor may be driven in a linear region by the reference voltage.

The comparison circuit may comprise a first comparator for comparing the first output voltage with the second output voltage, and generating the analog control voltage corresponding to a voltage difference between the first output voltage and the second output voltage, a second comparator for comparing the first reference voltage with the first output voltage, and generating the down count signal when the first output voltage is more than the first reference voltage, and a third comparator for comparing the second reference voltage with the second output voltage, and generating the up count signal when the second output voltage is less than the second reference voltage.

According to still another aspect, there is provided a filter tuning circuit for a wireless communication system comprising an input voltage generator for a differential input voltage composed of a positive input voltage and a negative input voltage which are symmetrical about a common voltage, a differential transconductor for outputting a differential output current linearly proportional to a differential input voltage according to an analog control voltage and a digital control signal, a current-voltage converter comprising a capacitor, wherein the current-voltage converter generates a charge voltage charged in the capacitor by the differential output current as a differential output voltage, a comparison circuit for generating an analog control voltage in response to the differential output voltage, and comparing a predetermined reference voltage with the differential output voltage to generate a count drive signal, and a counter circuit for generating the digital control signal increased or reduced by the number of a certain bit from the number of a reference bit according to the count drive signal.

The differential transconductor may comprise a transconductance driving unit for outputting a differential output current proportional to the differential input voltage, a degeneration tuning unit for tuning a degeneration amount of a source of the transconductance driving unit in response to the analog control voltage from the comparison circuit and the digital control signal from the counter circuit, and a common mode feedback unit for sensing and stabilizing a voltage of an output terminal of the transconductance driving unit.

The differential transconductor may comprise a first output terminal for outputting a positive current of the differential output current, and a second output terminal for outputting a negative current of the differential output current, the current-voltage converter may comprise a fourth node connected to the first output terminal electrically, a third current source and a first capacitor connected in series through the fourth node between a power supply voltage terminal and a ground, a fifth node connected to the second output terminal electrically, and a second capacitor and a fourth current source connected in series through the fifth node between the power supply voltage terminal and the ground.

The comparison circuit may output an up count signal driving the counter circuit to increase the number of bits of the digital control signal and output a down count signal driving the counter circuit to reduce the number of bits of the digital control signal.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
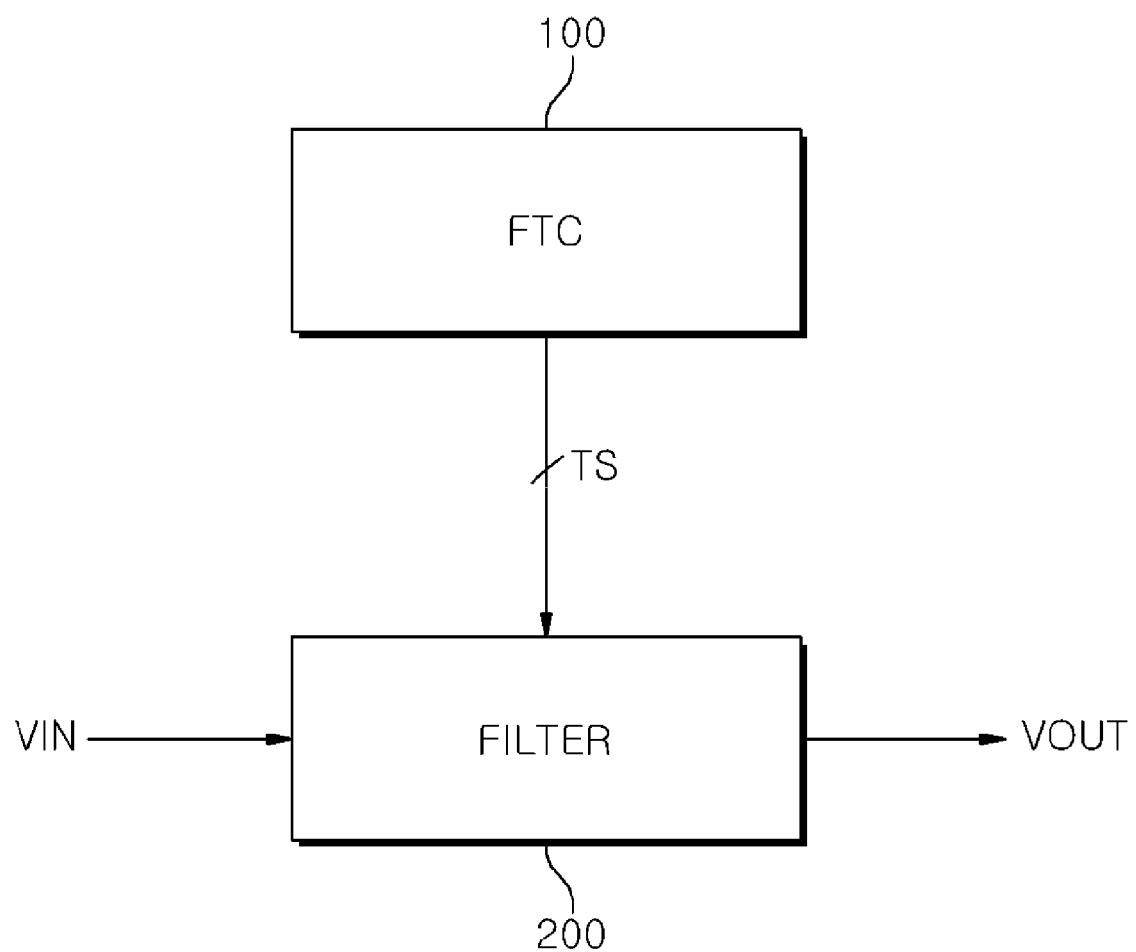
FIG. 1 is a block diagram illustrating a connection structure between a filter tuning circuit and a filter according to an exemplary embodiment.

FIG. 1 illustrates a connection structure between a filter tuning circuit and a filter according to an exemplary embodiment.

Referring to FIG. 1, a filter tuning circuit 100 automatically generates a tuning signal TS including an analog control voltage VCON and a digital control signal DCS in accordance with a circuit structure of an exemplary embodiment herein. The tuning signal TS including the analog control voltage VCON and an n-bit (n is a natural number) digital control signal DCS is applied to a filter 200.

The filter 200 may be designed by a transconductor or the combination of plural transconductors. Since a transconductance value (gm-value) of the transconductor varies with the changes of a process and an environment, the filter 200 designed using the transconductor may have an unstable cut-off frequency. Accordingly, to constantly keep the cut-off frequency of the filter 200, it is desirable to stably and precisely control the transconductance value (gm-value). According to an aspect, the filter 200 stably and precisely controls a value of a transconductance (gm) designed in the inside of the filter 200 according to the tuning signal TS applied from the filter tuning circuit 100.

The transconductor is also designed in the inside of the filter tuning circuit 100 according to an exemplary embodiment. Accordingly, a mixed design in connection with the filter 200 may be achieved in the filter tuning circuit 100. Consequently, according to an exemplary embodiment, a total area of a design may be efficiently reduced by the continuous design of the transconductor. Moreover, according to an exemplary embodiment, the whole noise and linearization of a system including the filter tuning circuit 100 and the filter 200 may be controlled.

Figure 2:
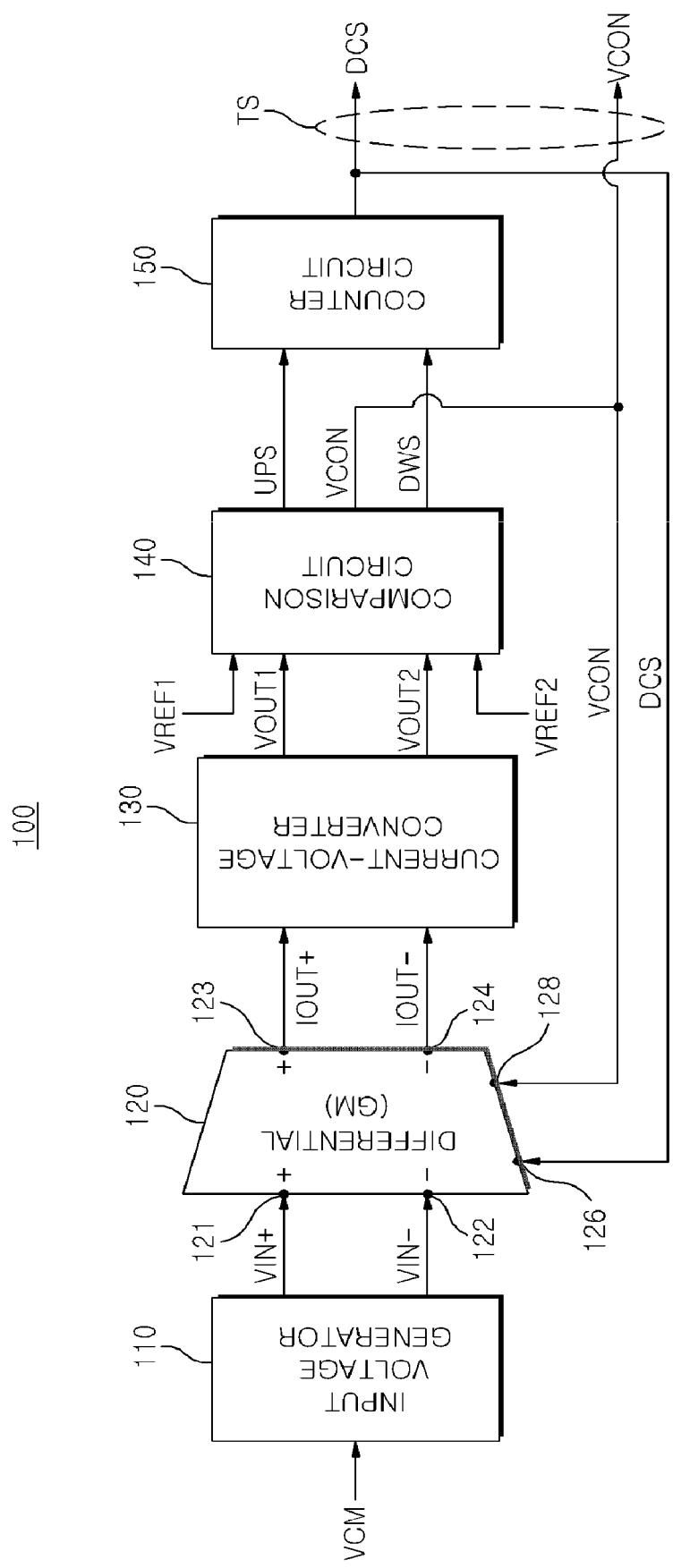
FIG. 2 is a block diagram illustrating an internal configuration of a filter tuning circuit of FIG. 1.

FIG. 2 illustrates an internal configuration of the filter tuning circuit 100 of FIG. 1 according to an exemplary embodiment.

Referring to FIG. 2, the filter tuning circuit 100 comprises an input voltage generator 110, a differential tansconductor 120, a current-voltage converter 130, a comparison circuit 140, and a counter circuit 150.

The input voltage generator 110 receives an external common voltage VCM and generates differential input voltages VIN+ and VIN− (hereinafter, referred to as an input voltage) having a positive input voltage VIN+ and a negative input voltage VIN− which are symmetrical about the common voltage VCM.

The differential transconductor 120 comprises a first input terminal 121, a second input terminal 122, a first output terminal 123, and a second output terminal 124. The first and second input terminals 121 and 122 receive the input voltage having the positive input voltage VIN+ and the negative input voltage VIN− provided from the input voltage generator 110. The differential transconductor 120 receives the input voltages VIN+ and VIN− from the input voltage generator 110, and generates differential output currents TOUT+ and IOUT− (hereinafter, referred to as an output current) which are linearly in proportion to the input voltages VIN+ and VIN−. Here, a proportional constant is the transconductance value (gm-value), and the differential output current is composed of a positive output current TOUT+ and a negative output current IOUT−.

The differential transconductor 120 further comprises a third input terminal 126 and a fourth input terminal 128. The third input terminal 126 receives a the n-bit digital control signal DCS from the counter circuit 150, and the fourth input terminal 128 receives the analog control voltage VCON from the counter circuit 150.

The filter tuning circuit 100 automatically controls the value of the differential transconductor 120 included in the inside of it using the tuning signal TS having the digital control signal DCS and the analog control voltage VCON applied to the filter 200.

The current-voltage converter 130 receives the output currents IOUT+ and IOUT− from the differential transconductor 120 to generate differential output voltages VOUT+ and VOUT− (hereinafter, referred to as an output voltage). The output voltage is composed of a first output voltage VOUT1 and a second output voltage VOUT2. That is, the current-voltage converter 130 generates the first output voltage VOUT1 in response to the positive output current TOUT+, and generates the second output voltage VOUT2 in response to the negative output current IOUT−.

The comparison circuit 140 respectively receives the first and second output voltages VOUT1 and VOUT2, and generates the analog control voltage VCON corresponding to a difference between the first and second output voltages VOUT1 and VOUT2. The differential transconductor 120 receives the feedback of the generated analog control voltage through the fourth input terminal 128 of it. The comparison circuit 140 further receives external first and second reference voltages VREF1 and VREF2, and generates a count drive signal for driving the counter circuit 150. The count drive signal is composed of an up count signal UPS and a down count signal DWS. Moreover, the first and second reference voltages VREF1 and VREF2 are defined as a voltage range where MOS transistors designed in the inside of the differential transconductor 120 are operated in a linear region. The comparison circuit 140 compares the first reference voltage VREF1 with the first output voltage VOUT1, generates the up count signal UPS on the basis of a result of the comparison, and applies the up count signal UPS to the counter circuit 150. The comparison circuit 140 compares the second reference voltage VREF2 with the second output voltage VOUT2, generates the down count signal DWS on the basis of a result of the comparison, and applies the down count signal DWS to the counter circuit 150.

Where the counter circuit 150 receives the up count signal UPS from the comparison circuit 140, it generates an n-bit digital control signal DCS which is increased by a specific bit from a reference bit. Where the counter circuit 150 receives the down count signal DWS from the comparison circuit 140, it generates an n-bit digital control signal DCS which is reduced by a specific bit from the reference bit. As an example, the counter circuit 150 may be implemented as an up-down counter generating a 4-bit digital control signal DCS.

Figure 3:
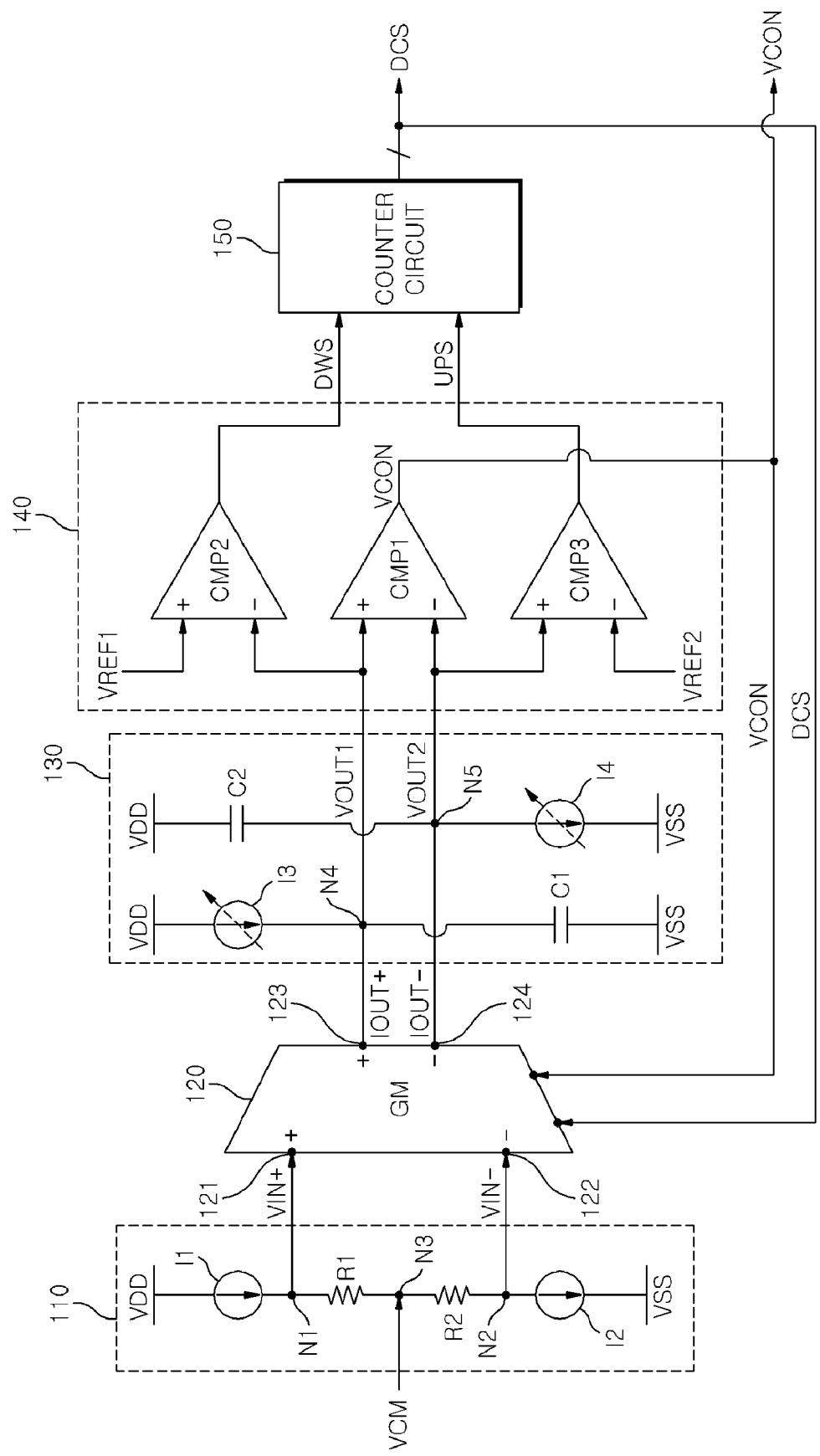
FIG. 3 is a circuit view illustrating internal configurations of an input voltage generator, a current-voltage converter and a comparison circuit of FIG. 2.

FIG. 3 illustrates internal configurations of the input voltage generator 110, the current-voltage converter 130 and the comparison circuit 140 of FIG. 2 according to an exemplary embodiment.

Referring to FIG. 3, the input voltage generator 110 comprises a first current source I1, a first resistor R1, a second resistor R2, and a second current source I2 connected in series between a power supply voltage terminal VDD and a ground VSS. The two resistors R1 and R2 are connected in series through a third node N3. The external common voltage VCM is applied to the third node N3. A first node N1 outputting the positive input voltage VIN+ is defined between the first current source I1 and the first resistor R1. A second node N2 outputting the negative input voltage VIN− is defined between the second resistor R2 and the ground VSS. Herein, the first and second resistors R1 and R2 have substantially the same resistance value, and the first and second current sources I1 and I2 is substantially the same current source. In the input voltage generator 110, the first current source I1 restricts that an electric potential of the first node N1 varies with the variation of a resistance value of the first resistor R1 by the change of a temperature. Likewise, the second current source I2 restricts that an electric potential of the second node N2 varies with the variation of a resistance value of the second resistor R2 by the change of a temperature. Although the resistance values of the first and second resistors R1 and R2 may vary with the change of a process, the input voltages VIN+ and VIN−, i.e., a voltage difference between the first node N1 and the second node N2 may be constantly kept.

The current-voltage converter 130 comprises a third current source I3, a first capacitor C1, a second capacitor C2, and a fourth current source I4. Moreover, the current-voltage converter 130 further comprises a fourth node N4 connecting the first output terminal 123 of the differential tranconductor 120 to any one of the two input terminals of the comparison circuit 140, and a fifth node N5 connecting the second output terminal 124 of the differential transconductor 120 to the remaining one of the two input terminals of the comparison circuit 140. The power supply voltage terminal VDD and the fourth node N4 are connected by the third current source I3, and the fourth node N4 and the ground VSS are connected by the first capacitor C1. The power supply voltage terminal VDD and the fifth node N5 are connected by the second capacitor C2, and the fifth node N5 and the ground VSS are connected by the fourth current source I4. Herein, the third and fourth current sources I3 and I4 are designed as substantially the same current source, and the first and second capacitors C1 and C2 are designed to have substantially the same capacitance value. A first charge voltage charged by the positive output current IOUT+ is charged in the first capacitor C1, and a second charge voltage charged y the negative output current IOUT− is charged in the second capacitor C2. The first charge voltage is applied to any one of the two input terminals of the comparison circuit 140 through the fourth node N4 as a first output voltage VOUT1, and the second charge voltage is applied to the remaining one of the two input terminals of the comparison circuit 140 through the fifth node N5 as a second output voltage VOUT2.

Where the transconductance (gm) varies with the change of a process, the transconductance (gm) may be controlled by the changes of the current values of the third and fourth current sources I3 and I4. As an example, the current values of the third and fourth current sources I3 and I4 may be varied by a fusing scheme.

The comparison circuit 140 determines whether the first output voltage VOUT1 is more than the second output voltage VOUT2 or not, and an external device (e.g., a phase discriminator or a phase comparator) and the differential transconductor 120 receive the feedback of the analog control voltage VCON according to a result of the determination. The value of the transconductance (gm) of the differential transconductor 120 is controlled according to the feedback analog control voltage VCON. Moreover, the comparison circuit 140 determines a difference between the first output voltage VOUT1 and the second output voltage VOUT1 is within a linear operation range of a MOS transistor constituting the differential transconductor 120, and generates the up count signal UPS or the down count signal DWS according to a result of the determination. The generated up count signal UPS or the generated down count signal DWS is applied to the counter circuit 150.

According to an aspect, the comparison circuit 140 comprises a first comparator CMP1, a second comparator CMP2, and a third comparator CMP3. The positive terminal (+) of the first comparator CMP1 is connected to the positive output terminal 123 of the differential transconductor 120 through the fourth node N4, and the positive terminal (−) of the first comparator CMP1 is connected to the negative output terminal 124 of the differential transconductor 120 through the fifth node N5. The first comparator CMP1 compares the first output voltage VOUT1 transferred through the fourth node N4 with the second output voltage VOUT2 transferred through the fifth node N5, and generates the analog control voltage VCON on the basis of a result of the comparison. The differential transconductor 120 receives the feedback of the generated analog control voltage VCON. The positive terminal (+) of the second comparator CMP2 receives a first reference voltage VREF1, and the negative terminal (−) of the second comparator CMP2 is connected to the fourth node N4 to receive the first output voltage VOUT1. The comparator CMP2 compares the first reference voltage VREF1 with the first output voltage VOUT1, and generates the down count signal DWS where the first output voltage VOUT1 is more than the first reference voltage VREF1. The third comparator CMP3 generates the up count signal UPS where the second output voltage VOUT2 is less than the second reference voltage VREF2.

Subsequently, where the counter circuit 150 receives the up count signal UPS from the comparison circuit 140, it generates an n-bit digital control signal DCS which is increased by a certain bit from a reference bit. Where the counter circuit 150 receives the down count signal DWS from the comparison circuit 140, it generates an n-bit digital control signal DCS which is reduced by a certain bit from the reference bit. As an example, the digital control signal DCS may be implemented as 4-bit data.

Figure 4:
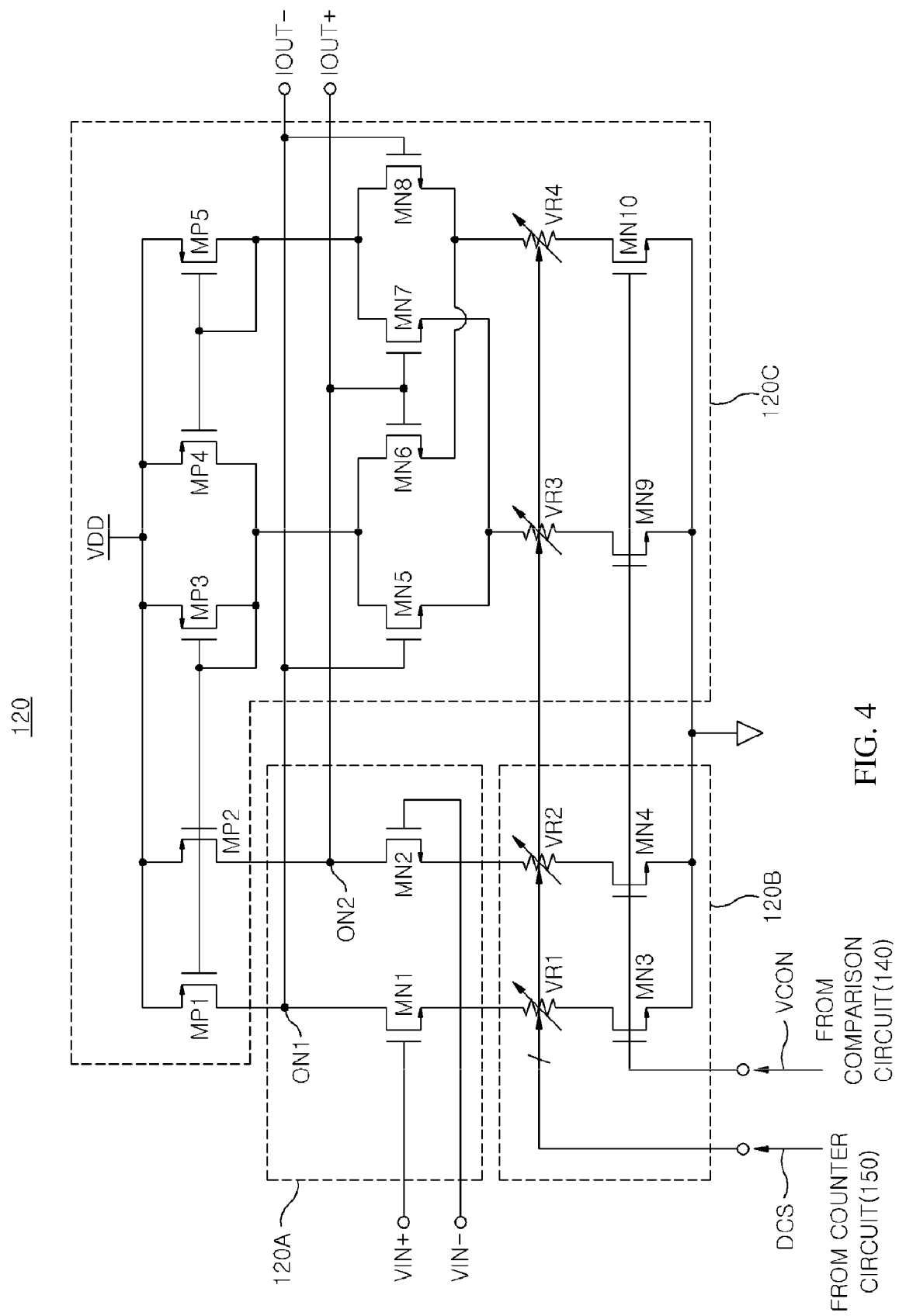
FIG. 4 is a circuit view illustrating an internal configuration of a differential transconductor of FIG. 3.

FIG. 4 is a circuit view illustration of an internal configuration of the differential transconductor 120 of FIG. 3 according to an exemplary embodiment.

Referring to FIG. 4, the differential transconductor 120 generates output currents IOUT+ and IOUT− which are proportional to or inverse proportional to the input voltages VIN+ and VIN− in response to the input voltages VIN+ and VIN− from the input voltage generator 110.

Specifically, the differential transconductor 120 comprises a transconductance driving unit 120A, a degeneration tuning unit 120B, and a common mode feedback unit 120C. The transconductance driving unit 120A comprises a first NMOS transistor MN1 and a second NMOS transistor MN2. The first NMOS transistor MN1 outputs the negative output current IOUT− in response to the positive input voltage VIN+ applied from the input voltage generator 110. The second NMOS transistor MN2 outputs the positive output current IOUT+ in response to the negative input voltage VIN−. A gate of the first NMOS transistor MN1 receives the positive input voltage VIN+, a drain of the first NMOS transistor MN1 is commonly connected to the common mode feedback unit 120C through a first output node ON1, and a source of the first NMOS transistor MN1 is connected to the degeneration tuning unit 120B. A gate of the second NMOS transistor MN2 receives the negative input voltage VIN−, a drain of the second NMOS transistor MN2 is commonly connected to the common mode feedback unit 120C through a second output node ON2, and a source of the second NMOS transistor MN2 is connected to the degeneration tuning unit 120B. The first and second NMOS transistors MN1 and MN2 are connected in parallel between the transconductance driving unit 120A and the degeneration tuning unit 120B, and respectively output the output currents IOUT− and IOUT+ having a level which is proportional to or inverse proportional to a level of the input voltages VIN+ and VIN− through the output nodes ON1 and ON2. Herein, the level of the output currents IOUT− and IOUT+ varies in proportional to a degeneration amount of the sources of the first and second NMOS transistors MN1 and MN2. The degeneration amount is tuned by the degeneration tuning unit 120B.

The degeneration tuning unit 120B tunes a degeneration amount of the sources of the first and second NMOS transistors MN1 and MN2 in response to the analog control voltage VCON from the comparison circuit 140 and the n-bit digital control signal DCS from the counter circuit 150. The degeneration tuning unit 120B comprises a third NMOS transistor MN3, a first variable resistor VR1, a fourth NMOS transistor MN4, and a second variable resistor VR2.

According to an aspect, the third NMOS transistor MN3 tunes a degeneration amount of the source of the first NMOS transistor MN1 included in the transconductor driving unit 120A in response to the n-bit digital control signal DCS from the counter circuit 150. The first variable resistor VR1 tunes a degeneration amount of the source of the first NMOS transistor MN1 together with the third NMOS transistor MN3 in response to the analog control voltage VCON from the comparison circuit 140. The fourth NMOS transistor MN4 tunes a degeneration amount of the source of the second NMOS transistor MN2 in response to the analog control voltage VCON from the comparison circuit 140. The second variable resistor VR2 tunes a degeneration amount of the source of the second NMOS transistor MN2 together with the fourth NMOS transistor MN4 in response to the digital control voltage DCS from the counter circuit 150. The first variable resistor VR1 and the third NMOS transistor MN3 are connected in series between the source of the first NMOS transistor MN1 and the ground VSS, and the second variable resistor VR2 and the fourth NMOS transistor MN4 are connected in series between the source of the second NMOS transistor MN2 and the ground VSS. The first variable resistor VR1 and the third NMOS transistor MN3 which are connected in series and the second variable resistor VR2 and the fourth NMOS transistor MN4 which are connected in series are connected in parallel between the transconductance driving unit 120A and the ground VSS. The third NMOS transistor MN3 has a gate receiving the analog control voltage VCON, a drain connected to a one terminal of the first variable resistor VR1, and a source connected to the ground VSS. The third NMOS transistor MN3 tunes a degeneration amount of the source of the first NMOS transistor MN1 in response to the analog control voltage VCON from the comparison circuit 140. The variable resistor VR1 is connected in series between the drain of the third NMOS transistor MN3 and the source of the NMOS transistor MN1. The first variable resistor VR1 tunes a degeneration amount of the source of the first NMOS transistor MN1 together with the third NMOS transistor MN3 in response to the n-bit digital control voltage DCS from the counter circuit 150. A gate of the fourth NMOS transistor MN4 receives the analog control voltage VCON, a drain of the fourth NMOS transistor MN4 is connected to a one terminal of the second variable resistor VR2, and the source of the fourth NMOS transistor MN4 is connected to the ground VSS. The fourth NMOS transistor MN4 tunes a degeneration amount of the source of the second NMOS transistor MN2 in response to the analog control voltage VCON from the comparison circuit 140. The second variable resistor VR2 is connected in series between the drain of the fourth NMOS transistor MN4 and the source of the second NMOS transistor MN2. The second variable resistor VR2 tunes a degeneration amount of the source of the second NMOS transistor MN2 together with the fourth NMOS transistor MN4 in response to the digital control voltage DCS from the counter circuit 150.

The common mode feedback unit 120C senses an electric potential of the output terminal of the transconductance driving unit 120A, and stabilizes the sensed electric potential. The common mode feedback unit 120C comprises first to fifth PMOS transistors MP1 to MP5, fifth to tenth NMOS transistors MN5 to MN10, and third and fourth variable resistors VR3 and VR4. The common mode feedback unit 120C senses and stabilizes a voltage of the output terminal of the transconductance driving unit 120B.

Specifically, the ninth NMOS transistor MN9 tunes a degeneration amount of the sources of the fifth and seventh NMOS transistors MN5 and MN7 in response to the analog control voltage VCON from the comparison circuit 140, respectively.

The third variable resistor VR3 tunes a degeneration amount of the sources of the fifth and seventh NMOS transistors MN5 and MN7 together with the ninth NMOS transistors MN9 in response to the digital control signal DCS from the counter circuit 150.

The tenth NMOS transistor MN10 tunes a degeneration amount of the sources of the sixth and eighth NMOS transistors MN6 and MN8 in response to the analog control voltage VCON from the comparison circuit 140.

The fourth variable resistor VR4 tunes a degeneration amount of the sources of the sixth and eighth NMOS transistors MN6 and MN8 together with the tenth NMOS transistor MN10 in response to the digital control signal DCS from the counter circuit 150.

Thus, the differential transconductor 120 adjusts a degeneration amount of the first NMOS transistor MN1, the second NMOS transistor MN2 and the fifth to eighth NMOS transistors MN5 to MN8 in response to the analog control voltage VCON and the digital control signal DCS. Accordingly, according to an exemplary embodiment, a proportional relationship between an output current level and an input voltage level may be linearly kept.

According to certain embodiments described above, a filter tuning circuit may automatically control the cut-off characteristics of a filter according to the change of a process or the change of an external environment.

A filter tuning circuit may comprise a differential transconverter according to an exemplary embodiment. Moreover, the filter tuning circuit may comprise a comparator and a counter which control a transconvertance value of the differential transconverter to stably and precisely tune of a filter.

A filter tuning circuit according to an exemplary embodiment may efficiently reduce power consumption and an area of a design without requiring an external clock separately.

Where a filter tuning circuit according to an exemplary embodiment tunes a filter in which a transconductor is included, a mixed design in connection with the filter may be achieved in the filter tuning circuit. Accordingly, an area of a design in a total system may be reduced by the continuous disposition design of a transconductor.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A filter tuning circuit for a wireless communication system, comprising:
   a differential transconductor for outputting a differential output current proportional to a differential input voltage;
   a current-voltage converter comprising a capacitor, wherein the current-voltage converter generates a charge voltage charged in the capacitor by the differential output current as a differential output voltage;

a comparison circuit for generating an analog control voltage in response to the differential output voltage, and comparing a predetermined reference voltage with the differential output voltage to generate a count drive signal; and a counter circuit for generating a digital control signal increased or reduced by the number of a certain bit from the number of a reference bit according to the count drive signal, wherein the differential transconductor receives the feedback of the analog control voltage from the comparison circuit and the feedback of the digital control signal from the counter circuit.

2. The filter tuning circuit of claim 1, wherein the differential tranconductor outputs the differential output current linearly proportional to the differential input voltage on the basis of the feedback analog control voltage and the feedback digital control signal.

3. The filter tuning circuit of claim 1, further comprising an input voltage generator for receiving a predetermined common voltage, and generating the differential input voltage having a positive input voltage and a negative input voltage which are symmetrical about the common voltage.

4. The filter tuning circuit of claim 3, wherein the input voltage generator comprises a first current source, a first resistor, a second resistor, and a second current source which are connected in series between a power supply voltage terminal and a ground, outputs the positive input voltage through a first node connecting the first current source to the first resistor electrically, and outputs the negative input voltage through a second node connecting the second current source to the second resistor electrically.

5. The filter tuning circuit of claim 1, wherein the differential transconductor comprises:
a transconductance driving unit for outputting a differential output current proportional to the differential input voltage;
a degeneration tuning unit for tuning a degeneration amount of a source of the transconductance driving unit in response to the analog control voltage from the comparison circuit and the digital control signal from the counter circuit; and
a common mode feedback unit for sensing and stabilizing a voltage of an output terminal of the transconductance driving unit.

6. The filter tuning circuit of claim 5, wherein the transconductance driving unit comprises:
a first NMOS transistor for outputting a negative current of the differential output current in response to a positive voltage of the differential input voltage; and
a second NMOS transistor for outputting a positive current of the differential output current in response to a negative voltage of the differential input voltage.

7. The filter tuning circuit of claim 5, wherein the degeneration tuning unit comprises:
a first NMOS transistor for a degeneration resistor for tuning a degeneration amount of a source of the first NMOS transistor according to the analog control voltage;
a first variable resistor for tuning a degeneration amount of a source of the first NMOS transistor together with the first NMOS transistor for the degeneration resistor according to the digital control signal;
a second NMOS transistor for a degeneration resistor for tuning a degeneration amount of a source of the second NMOS transistor according to the analog control voltage; and a second variable resistor for tuning a degeneration amount of the second NMOS transistor together with the second NMOS transistor for the degeneration resistor according to the digital control signal.

8. The filter tuning circuit of claim 1, wherein the differential transconductor comprises:
a first output terminal for outputting a positive current of the differential output current; and
a second output terminal for outputting a negative current of the differential output current,
and wherein the current-voltage converter comprises:
a fourth node connected to the first output terminal electrically;
a third current source and a first capacitor connected in series through the fourth node between a power supply voltage terminal and a ground;
a fifth node connected to the second output terminal electrically; and
a second capacitor and a fourth current source connected in series through the fifth node between the power supply voltage terminal and the ground.

9. The filter tuning circuit of claim 1, wherein the differential output voltage is composed of a first output voltage corresponding to a positive current of the differential output current and a second output voltage corresponding to a negative current of the differential output current, and the comparison circuit comprises a first comparator for generating the analog control voltage corresponding to a voltage difference between the first output voltage and the second output voltage.

10. The filter tuning circuit of claim 9, wherein the comparison circuit outputs an up count signal driving the counter circuit to increase the number of bits of the digital control signal and outputs a down count signal driving the counter circuit to reduce the number of bits of the digital control signal.

11. The filter tuning circuit of claim 10, wherein the count drive signal output from the comparison circuit comprises an up count signal driving the counter circuit to increase the number of bits of the digital control signal and a down count signal driving the counter circuit to reduce the number of bits of the digital control signal.

12. The filter tuning circuit of claim 11, wherein the comparison circuit comprises:
a first comparator for comparing the first output voltage with the second output voltage, and generating the analog control voltage corresponding to a voltage difference between the first output voltage and the second output voltage;
a second comparator for comparing the first reference voltage with the first output voltage, and generating the down count signal when the first output voltage is more than the first reference voltage; and
a third comparator for comparing the second reference voltage with the second output voltage, and generating the up count signal when the second output voltage is less than the second reference voltage.

13. The filter tuning circuit of claim 10, wherein the reference voltage applied to the comparison circuit has a voltage level between a first reference voltage and a second reference voltage less than the first reference voltage, and MOS transistors designed in the differential transconductor are driven in a linear region by the reference voltage.

14. A filter tuning circuit for a wireless communication system, comprising:

an input voltage generator for a differential input voltage composed of a positive input voltage and a negative input voltage which are symmetrical about a common voltage;

a differential transconductor for outputting a differential output current linearly proportional to a differential input voltage according to an analog control voltage and a digital control signal;

a current-voltage converter comprising a capacitor, wherein the current-voltage converter generates a charge voltage charged in the capacitor by the differential output current as a differential output voltage;

a comparison circuit for generating an analog control voltage in response to the differential output voltage, and comparing a predetermined reference voltage with the differential output voltage to generate a count drive signal; and a counter circuit for generating the digital control signal increased or reduced by the number of a certain bit from the number of a reference bit according to the count drive signal.

15. The filter tuning circuit of claim 14, wherein the differential transconductor comprises:

a transconductance driving unit for outputting a differential output current proportional to the differential input voltage;

a degeneration tuning unit for tuning a degeneration amount of a source of the transconductance driving unit in response to the analog control voltage from the comparison circuit and the digital control signal from the counter circuit; and a common mode feedback unit for sensing and stabilizing a voltage of an output terminal of the transconductance driving unit.

16. The filter tuning circuit of claim 14, wherein the differential transconductor comprises:

a first output terminal for outputting a positive current of the differential output current; and a second output terminal for outputting a negative current of the differential output current, the current-voltage converter comprises:

a fourth node connected to the first output terminal electrically;

a third current source and a first capacitor connected in series through the fourth node between a power supply voltage terminal and a ground;

a fifth node connected to the second output terminal electrically; and a second capacitor and a fourth current source connected in series through the fifth node between the power supply voltage terminal and the ground.

17. The filter tuning circuit of claim 14, wherein the comparison circuit outputs an up count signal driving the counter circuit to increase the number of bits of the digital control signal and outputs a down count signal driving the counter circuit to reduce the number of bits of the digital control signal.

\* \* \* \* \*